April 25, 1961    J. J. COLEMAN    2,981,784
ALKALINE CELL WITH PRE-ASSEMBLED NEGATIVE TERMINAL
Filed Oct. 28, 1957
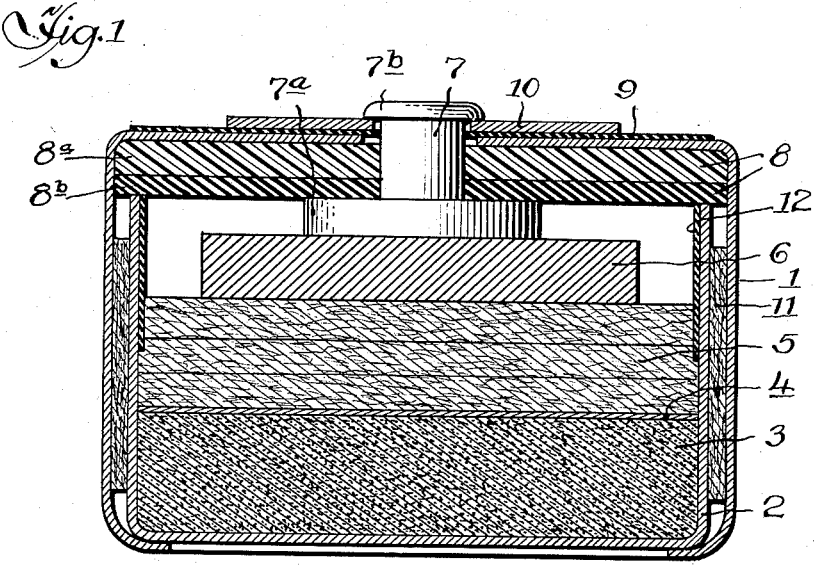
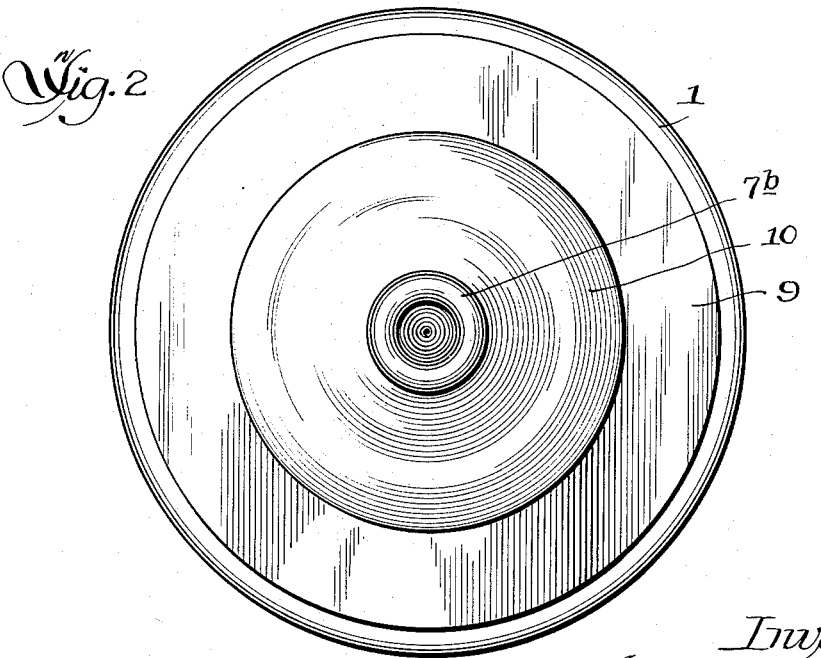
Inventor,
Joseph J. Coleman,
By: Jones, Darbo & Robertson,
Attys.

United States Patent Office 2,981,784
Patented Apr. 25, 1961

2,981,784
ALKALINE CELL WITH PRE-ASSEMBLED NEGATIVE TERMINAL

Joseph J. Coleman, Freeport, Ill., assignor, by mesne assignments, to Servel, Inc., Evansville, Ind., a corporation of Delaware Filed Oct. 28, 1957, Ser. No. 692,668

7 Claims. (Cl. 136—166)

This invention relates to primary cells and is particularly concerned with air-tight enclosures for such cells which have provision for venting during discharge.

Alkaline primary cells, especially those containing mercuric oxide depolarizers, have very desirable properties among the most useful of which is high capacity per unit volume. Such cells are generally comprised of an amalgamated zinc anode, a mercuric oxide cathode, an aklaline electrolyte substantially immobilized in an absorbent separator such as webril, and a metallic container for the cell. Because of the highly caustic nature of the electrolyte, it is important that the cell closure be air-tight and leak-proof, first to prevent the electrolyte from leaking out, and second to prevent carbon dioxide present in the air from entering the cell and forming a carbonate with the alkali electrolyte.

During the operation of an alkaline cell, and even on standing, gas may form therein. Consequently, in spite of the fact that the cell enclosure must normally be airtight, provision must be made to vent the gas thus formed when excessive pressure is generated in order to prevent the cell casing from bulging or, in some cases, even exploding.

The prior art is replete with attempts by various means to provide such cell enclosures which are air-tight but which still permit the venting of the gases formed. One method has been to provide a closed crack or split in the wall of the cell container which would be ruptured by the pressure of the gas formed. Another method has been to weaken the cell wall at a point to enable it to rupture at a predetermined gas pressure. Another method has been to provide a spring force maintained against the sealing member. In most cases the venting means was provided mainly for emergencies and was not useful for venting the cell under normal use. Even where means was provided for venting under normal conditions, because of the nature of the structures used, it was impossible to predetermine the pressure release operating conditions with precision.

It is an object of the present invention to provide an alkaline primary cell having a structure which prevents the electrolyte or reduced mercury from escaping out of the cell.

It is a further object to provide a cell having a means for venting gases formed and wherein the pressure at which gases will be vented can be predetermined with precision.

It is a further object to provide a cell whose enclosure is comprised of two oppositely disposed nested cups which lend themselves to mass production.

Other objects and advantages will become more apparent from the following description in conjunction with the accompanying drawings in which:

Figure 1 is a vertical sectional view of the cell showing the structure of the invention, and Figure 2 is a top view of the cell showing the terminal construction.

In the embodiment shown in Figure 1, two open-top cups, an outer cup 1 and an inner cup 2, are arranged in nested position facing each other to form the enclosure for the cell. An annular space is provided between the cups. Arranged in stacked relationship within the interior of the inner cup 2 are the active chemical elements of the cell, including the depolarizer 3, a barrier disk 4, an electrolyte-receptive spacer 5, and a zinc anode 6.

Attached to the outer cup 1 by means of a rivet 7 or other equivalent fastening means are the sealing disk 8, an insulating disk 9, and a conductive terminal disk 10. The upset end 7b of the rivet, together with the terminal disk 10 form the negative terminal of the cell. The head 7a of the rivet is maintained in pressure relationship and in electrical contact with the anode 6. In the annular space between the inner and outer cup is an electrolyte-absorbent band 11. Within the inner cup 2 and adjacent to the anode 6 and separator 5 may be placed an insulating cylinder 12 to prevent possible short-circuiting of the cell.

In Figure 2 is shown the outer cup 1, the insulating disk 9, the metallic terminal disk 10, and the upset portion 7b of the rivet.

The cups 1 and 2 are made of a suitable rigid material such as steel or nickle-plated steel. A 0.15 inch thick deep-drawing steel has been found to be suitable. This material is sufficiently thick to withstand the gas pressure developed during operation of the cell. The inner cup 2 is of a smaller diameter and somewhat shorter in height than the outer cup 1. The absorbent cylinder 11 which is placed in the annular space between the cups may be of any suitable absorbent material such as cardboard or paper. The hole provided in outer cup 1 for rivet 7 is somewhat larger than the diameter of the rivet in order to prevent electrical contact of the rivet which is part of the negative terminal with the outer cup which is in electrical connection with the positive terminal, which contact would result in short-circuiting of the cell.

The depolarizing cathode 3 is composed of a mixture of a powdered oxygen-yielding substance such as mercuric oxide, mercurous oxide, silver oxide, silver peroxide, cuprous oxide, or other readily reduceable oxygen-yielding compound or mixtures thereof, and a suitable conductive substance such as micronized graphite. The depolarizer is compressed into the inner can to about ⅓ of its height.

The barrier disk 4 rests upon the top surface of the depolarizer. It is made of a suitable liquid- and ion-permeable material which is substantially resistant to the action of the electrolyte, such as parchment paper, porous vinyl resin, vinylidene resin, or compressed magnesium oxide or magnesium silicate. The barrier disk prevents particles of the depolarizer, graphite or reduced mercury from migrating through the cell and causing electrical short-circuiting. It preferably has an initial diameter somewhat larger than that of the depolarizer so that it fits tightly in place in the cell.

The electrolyte-receptive separator 5 presses against the barrier disk and is composed of a suitable porous, absorbent, electrolyte-resistant material such as wood fibers or cotton fibers, as for example porous absorbent paper or absorbent cotton. A preferred material is webril, a fibrous cellulose pad. In order to obtain a sufficient thickness, the separator may be composed of several pads in stacked relationship. It is maintained under compression between the anode 6 and the barrier disk 4 and contains the major part of the cell electrolyte absorbed therein.

The electrolyte is generally an aqueous solution of sodium, potassium, or lithium hydroxide, or a mixture thereof. It may additionally contain dissolved therein an oxide such as zinc oxide or aluminum oxide to inhibit attack by the electrolyte on the anode during the time the cell is not in operation.

The anode is composed of an electronegative metal such as zinc. In order that it may have a high surface area and readily absorb the cell electrolyte, it is preferably made by compressing zinc powder into a pellet. Prior to formation of the anode the zinc powder is preferably amalgamated to protect it from the cell electrolyte when the cell is not in operation. The anode is held in pressure contact against the separator by the rivet head 7a.

The rivet 7 is made of any suitable conducting material such as steel which is sufficiently malleable so that its end may be upset. The rivet head 7a preferably has a rather large surface area for engagement with the anode, and also for forming an airtight seal with the sealing disk, and is preferably coated with a metal such as zinc or nickel to prevent chemical action by the electrolyte thereon.

The sealing disk is composed of a resilient, yieldable material such as neoprene, polyethylene, modified polystyrene, vinyl plastic, vulcanized fiber, etc. In a preferred embodiment as illustrated in Figure 1, the sealing disk is of a laminated construction having an upper layer 8a which is less resilient and semi-rigid, such as a laminated phenolic resin sheet or melamine resin sheet reinforced with fiber glass, and one or more layers of resilient material 8b. If only one resilient layer is used, as in the cell illustrated, the disk should be arranged so that the resilient layer is in contact with the lip of the inner cup and the rivet head, the semi-rigid disk serving as a backing to give stiffness. If more than one resilient layer is used, one should be at each surface of the less resilient layer. The sealing disk has a diameter substantially the same as the inside of the outer cup and serves as a closure for the inner cup which contains the active cell materials. It is maintained in pressure contact with the lip of the inner cup when the lip of the outer cup is crimped over the bottom of the inner cup in the assembly of the cell.

The terminal disk or washer 10 may be of a conducting material such as steel or plated steel. The disk 9 serves to insulate the outer cup from terminal 10. It will be understood that terminal disk 10 is not indispensible. When suitably designed, the end 7b of the rivet or other fastening means may bear directly against insulating disk 9.

In accordance with the essential aspect of the invention, the outer cup, negative terminal 10, insulating disk 9, and sealing disk 8 are assembled as a single unit. The active chemical cell elements are placed in the inner cup. The cell is then assembled by placing the outer cup over the inner cup and absorbent band 11. The cell is then sealed by crimping the lip of the outer cup over the bottom of the inner cup. This provides an axial clamping force which compresses the sealing disk against the inner cup lip to maintain a good air-tight seal.

Moderate pressure generated within the cell is not harmful, but when the pressure becomes excessive it is necessary to vent some of the gas to relieve the pressure. In the cell of the invention herein described, when the gas pressure has built up to a predetermined value, it will force the resilient layer of the sealing disk away from the inner cup lip at one or more points to allow the passage of a small amount of gas between the sealing lid and inner cup lip. This gas then escapes through the annular space between the outer cup 1 and the inner cup 2, through the absorbent cylinder 11 which removes any accompanying electrolyte, and out between the inner cup and the outer cup crimp which is inherently not airtight. During assembly the crimping force is controlled so that the pressure level at which the gas will vent is established within predetermined limits.

The features of the present cell construction offer many advantages over similar cells in the prior art. First, the negative terminal assembly may be fabricated in one simple operation which is readily adaptable to mass production methods. Second, because appreciable force may be used in upsetting the rivet which forms the negative terminal, a positive seal is effected between the resilient layer of the sealing disk 8 and the rivet head 7a preventing any possible leakage of gas or electrolyte at the negative terminal. Third, because of the construction of the cell, all the active cell elements are contained within the inner cup so that the only possible path of leakage of either gas or electrolyte is between the sealing disk and the lip of the inner cup.

Invention is claimed as follows:

1. A negative terminal and sealing closure sub-assembly for a primary electric cell comprising a metallic cup having a central opening in the bottom thereof, a centrally-apertured disk of resilient insulating material within said cup and covering and engaging the bottom thereof, a centrally-apertured disk of insulating material overlying at least the central portion of the exterior surface of the bottom of said cup, and electrically conductive fastening means clamping said disks tightly together, said fastening means being exposed both inside and outside of said cup and having an end portion overlying and engaging with resilient pressure at least the central portion of said disk of resilient material to seal off the aperture therein.

2. A sub-assembly in accordance with claim 1 wherein the fastening means comprises a rivet.

3. A sub-assembly in accordance with claim 1 and including a centrally-apertured metallic disk arranged exteriorly of the disk of insulating material and held in pressure engagement therewith by the fastening means.

4. A negative terminal and sealing closure sub-assembly for a primary electric cell comprising a metallic cup having a central opening in the bottom thereof, a centrally-apertured disk of semi-rigid insulating material within said cup and covering and engaging the bottom thereof, a centrally-apertured disk of resilient insulating material within said cup and covering and engaging said semi-rigid disk, a centrally-apertured disk of insulating material overlying at least the central portion of the exterior surface of the bottom of said cup, and electrically conductive fastening means clamping said disks tightly together, said fastening means being exposed both inside and outside of said cup and having an end portion overlying and engaging with resilient pressure at least the central portion of said disk of resilient material to seal off the aperture therein.

5. A sub-assembly in accordance with claim 4 and including a centrally-apertured metallic disk arranged exteriorly of the disk of insulating material and held in pressure engagement therewith by the fastening means.

6. A primary electric cell comprising in combination an inner metal cup containing therein the active cell elements comprising an anode, a cathode, and a separator containing electrolyte; and a negative terminal and sealing closure sub-assembly, said sub-assembly comprising a metallic cup having a central opening in the bottom thereof, a centrally-apertured laminated disk within said cup, said laminated disk comprising a semi-rigid lamination covering and engaging the bottom of said cup and a resilient lamination covering and engaging the lip of said inner cup, a centrally apertured disk of insulating material overlying at least the central portion of the exterior surface of the bottom of said cup, and an electrically conductive negative terminal means clamping said disks tightly together and to the bottom of said metallic cup, said cups being nested one within the other, the lip of said metallic cup being crimped over the bottom of said inner cup and applying axial clamping force against said sealing disk to form a yieldable seal against said inner cup lip.

7. A primary electric cell comprising a cell enclosure including a pair of oppositely oriented metal cups nested one within the other, the side walls of said cups being spaced apart to form an annular space therebetween, active cell elements comprising an anode, a cathode, and a separator containing cell electrolyte contained entirely within the inner one of said cups, sealing means affixed to the bottom of said outer cup comprising a laminated disc having a resilient layer in contact with the lip of and forming a closure for the inner cup and a less resilient and semi-rigid second layer arranged as a semi-rigid backing for said resilient layer, and negative terminal means, said negative terminal means being insulated from said outer cup, the lip of said outer cup being crimped over the bottom of said inner cup applying axial clamping force to cause said sealing means to form a yieldable seal against said inner cup lip.

References Cited in the file of this patent

UNITED STATES PATENTS

| | | |
|---|---|---|
| 2,464,022 | Carpenter | Mar. 8, 1949 |
| 2,592,439 | Lee | Apr. 8, 1952 |
| 2,601,267 | Ellis | June 24, 1952 |
| 2,816,153 | Kort | Dec. 10, 1957 |
| 2,829,186 | Kort | Apr. 1, 1958 |